(12) United States Patent
Mittermeier (10) Patent No.: US 9,346,470 B2
(45) Date of Patent: May 24, 2016

(54) BUTTONLESS VEHICLE KEY HAVING GESTURE RECOGNITION

(71) Applicant: Bayerische Motoren Werke Aktiengesellschaft, Munich (DE)

(72) Inventor: Rainer Mittermeier, Landshut-Auloh (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 14/478,348

(22) Filed: Sep. 5, 2014

(65) Prior Publication Data

US 2014/0379175 A1 Dec. 25, 2014

Related U.S. Application Data

(63) Continuation of application No. PCT/EP2013/053181, filed on Feb. 18, 2013.

(30) Foreign Application Priority Data

Mar. 6, 2012 (DE) .......................... 10 2012 203 535

(51) Int. Cl.
*G06F 17/00* (2006.01)
*B60W 50/10* (2012.01)
(Continued)

(52) U.S. Cl.
CPC ............ *B60W 50/10* (2013.01); *B60R 25/2045* (2013.01); *G06F 3/017* (2013.01); *G07C 9/00182* (2013.01); *G07C 9/00309* (2013.01); *G07C 2009/0096* (2013.01)

(58) Field of Classification Search
CPC ............ B60R 2325/101; B60R 25/257; B60R 25/406; G07C 9/00309; G07C 2009/00793; G06F 3/01; G05B 19/00

USPC ............ 701/2; 340/5.64, 5.72, 12.22, 426.16; 367/198
See application file for complete search history.

(56) References Cited

U.S. PATENT DOCUMENTS 5,988,307 A * 11/1999 Yamada .................... B60K 6/26
                                                    180/243
8,232,756 B2 * 7/2012 Yoshihara ................ B60K 6/48
                                                    318/430
(Continued)

FOREIGN PATENT DOCUMENTS

DE           101 05 060 A1     8/2002
DE      10 2006 015 930 A1    12/2006
(Continued)

OTHER PUBLICATIONS

German language Search Report dated Oct. 17, 2012, with English translation (Ten (10) pages).
International Search Report (PCT/ISA/210) dated May 7, 2013, with English translation (Seven (7) pages).

*Primary Examiner* — McDieunel Marc
(74) *Attorney, Agent, or Firm* — Crowell & Moring LLP (57) ABSTRACT

A device and method are provided for controlling functions of a vehicle on the basis of gestures. A radio key is configured to control at least one function in a vehicle. The radio key includes a gesture detection module, which is configured to detect a movement sequence of the radio key; and a control module, which is configured to initiate the execution of a function associated with the detected movement sequence in the vehicle. The radio key can be configured to ascertain a position of the radio key in relation to the vehicle, so that the function associated with the detected movement sequence in the vehicle can be dependent on the position of the radio key.

19 Claims, 3 Drawing Sheets

(51) Int. Cl.
*G07C 9/00* (2006.01)
*B60R 25/20* (2013.01)
*G06F 3/01* (2006.01)

(56) References Cited

U.S. PATENT DOCUMENTS

2014/0136024 A1* 5/2014 Herthan .............. B60R 25/2045
701/2
2015/0128497 A1* 5/2015 Schuetz .................. E05F 15/73
49/31

FOREIGN PATENT DOCUMENTS

| | | |
|---|---|---|
| DE | 10 2006 037 237 A1 | 2/2008 |
| DE | 10 2010 021 108 A1 | 11/2011 |
| EP | 1 184 827 A2 | 3/2002 |
| EP | 1 972 511 A1 | 9/2008 |
| EP | 1972511 A * | 9/2008 |
| FR | 2 820 535 A1 | 8/2002 |
| WO | WO 2011/054720 A1 | 5/2011 |
| WO | WO 2012/119681 A1 | 9/2012 |

* cited by examiner

BUTTONLESS VEHICLE KEY HAVING GESTURE RECOGNITION

CROSS REFERENCE TO RELATED APPLICATIONS

This application is a continuation of PCT International Application No. PCT/EP2013/053181, filed Feb. 18, 2013, which claims priority under 35 U.S.C. §119 from German Patent Application No. 10 2012 203 535.4, filed Mar. 6, 2012, the entire disclosures of which are herein expressly incorporated by reference.

BACKGROUND AND SUMMARY OF THE INVENTION

The invention relates to a device and a method for controlling functions of a vehicle on the basis of gestures.

Vehicles (in particular motor vehicles) are currently typically equipped with radio keys. These radio keys usually have a plurality of physical (largely mechanical) buttons, which can be used for opening, closing, and/or for unlocking the trunk. In some countries (for example, the USA), the radio keys additionally have a dedicated physical panic button, by the actuation of which the alarm system of the vehicle can be activated. Fixed functions (for example, opening/closing the doors, triggering the alarm system, etc.) are generally associated with the physical buttons of the radio key. A subsequent adaptation of the function associated with the button is only possible in a very restricted scope (for example, the restriction of the "opening/closing" function to the driver door or the expansion of the "opening/closing" function to all doors of the vehicle).

The construction (i.e., in particular the design and the size) of conventional radio keys of vehicles is decisively influenced by the physical buttons. Further integration and reduction in size of the radio key is generally limited by an ergonomically required minimum size of the physical buttons. Furthermore, accommodating the buttons in the radio key results in relatively complex construction methods and relatively complex production processes.

The physical buttons of a radio key usually each have an electrical switch or an electrical sensor, which detects an actuation of an associated button by a user. The structure of a button thus requires, for example, a microswitch, suitable control electronics, a pressure-sensitive mat, the use of multicomponent plastics, special glazing of the button symbols, etc. The costs of the buttons and the associated switches/electronics are therefore typically substantial in comparison to the overall costs of a radio key. Furthermore, the buttons can impair the leak-tightness of the radio key, which makes it more difficult to protect the electronic components in the interior of the radio key against environmental influences. Susceptibility of the radio key to environmental influences, for example, moisture, can result in substantial warranty costs for the producers of motor vehicles.

Finally, the number of vehicle functions which can be controlled using a radio key is limited by the number of the buttons of the radio key. In addition, the vehicle functions associated with a key can only be adapted to the requirements of the user to a very limited extent.

In addition to the control of vehicle functions in the exterior of the vehicle (for example, the opening/closing of vehicle doors), the demand exists for simple control of functions in the interior of the vehicle (for example, the control of functions of an information and entertainment system or the control of functions of an air-conditioning system of the vehicle). For this purpose, a vehicle typically has a plurality of buttons in the interior of the vehicle, on the basis of which the respective functions can be controlled. These buttons are usually only accessible by the driver of the vehicle, so that passengers (in particular passengers on rear seats of the vehicle) usually have no capability for activating a specific vehicle function in the interior of the vehicle. In addition, the driver can be distracted from the traffic during the actuation of a button for controlling a vehicle function, which could result in safety risks.

The present invention addresses the above-described technical problems in the control of vehicle functions. In particular, the present invention describes a robust and cost-effective radio key, which can be used in a flexible manner for controlling a plurality of functions in the exterior and/or in the interior of a vehicle.

According to one aspect, a radio key is described, which is configured to control at least one function in a vehicle. The radio key can be configured to communicate with a corresponding vehicle via a radio interface (for example, a high frequency, HF, radio interface). The radio key can furthermore be configured to authenticate itself with the vehicle via this radio interface. In particular, the radio key can comprise a communication module, via which the radio key communicates with the vehicle and/or via which the radio key authenticates itself with the vehicle.

The radio key includes a gesture detection module, which is configured to detect a movement sequence of the radio key. The gesture detection module can include, for example, a gyroscope and/or an acceleration sensor. In particular, the gesture detection module can have a three-axis gyroscope in combination with a three-axis acceleration sensor.

Furthermore, the radio key includes a control module (for example, a microprocessor), which is configured to initiate the execution of a function associated with the detected movement sequence in the vehicle. This can be performed, for example, in that the radio key transmits a signal associated with the detected movement sequence to the vehicle (for example, to a corresponding supervision unit in the vehicle). The signal associated with the detected movement sequence can comprise, for example, a sequence of sensor signals, which were detected by the gesture detection module as a result of the movement sequence of the radio key. The control module can also be configured to determine whether the detected movement sequence corresponds to a first of at least one predefined gesture event. For this purpose, the control module can compare the detected movement sequence (for example, the detected sequence of sensor signals) to the at least one predefined gesture event (for example, to at least one predefined reference sequence of sensor signals). If the detected movement sequence corresponds to the first predefined gesture event (for example, if the above-mentioned comparison results in a sufficient similarity of the detected movement sequence to the first predefined gesture event), the control module can be configured to initiate the execution of a function associated with the first predefined gesture event in the vehicle.

In one exemplary embodiment, the radio key includes a memory module (for example, a random access memory (RAM)), which is configured to store a plurality of predefined gesture events. In this case, the control module can be configured to determine whether the detected movement sequence corresponds to a first of the plurality of predefined gesture events. In particular, for this purpose, the control module can compare the detected movement sequence (for example, the detected sequence of sensor signals) to the plurality of predefined gesture events (for example, to a plurality of reference sequences, which describe the predefined gesture events), and determine that the first gesture event exceeds a similarity threshold value and has a maximum similarity to the detected movement sequence in relation to the other predefined gesture events.

The radio key can furthermore be configured (via the communication module) to transmit a transmission signal associated with the first predefined gesture event, where the transmission signal is suitable for the purpose of informing the vehicle that the first predefined gesture event was detected at the radio key. The transmission signal can comprise one of a plurality of code words, for example, which uniquely identify the first predefined gesture event in relation to the others of the plurality of gesture events. The transmission of a transmission signal associated with a gesture event generally requires a smaller transmission bandwidth on the radio interface between radio key and vehicle than, for example, the transmission of the (possibly coded) sequence of sensor signals, which was detected by the gesture detection module.

The radio key can be configured for the purpose of recognizing that the radio key is located in a predefined vicinity (for example, in a vicinity of less than 2 meters) of the vehicle. For this purpose, the radio key can receive signals from the vehicle (for example, from the supervision unit in the vehicle) and thus ascertain whether it is located in the predefined vicinity. The gesture detection module can be configured for the purpose of only detecting the movement sequence of the radio key when the radio key is located in the predefined vicinity of the vehicle. A power consumption of the radio key can therefore be decreased.

The radio key can be configured to ascertain a position of the radio key in relation to the vehicle. For this purpose, the radio key can receive a plurality of signals from a plurality of points of the vehicle. The signals received from the radio key can be analyzed to ascertain the position of the radio key (for example, interior or exterior of the vehicle). For example, the vehicle comprises a "keyless go" function, on the basis of which a position of the radio key can be ascertained. The function associated with the detected movement sequence in the vehicle can therefore be dependent on the position of the radio key.

The at least one function in the vehicle can include one or more of the following functions: a function with respect to a lighting of the vehicle (for example, front headlights on/off; "follow me home" lighting on/off); a function with respect to external mirrors, doors, windows, or a trunk of the vehicle (for example, fold external mirrors in/out, open/close driver door, lower/raise windows, open/close trunk); a function with respect to an alarm system of the vehicle (for example, panic function); function with respect to an air-conditioning system of the vehicle (for example, raise/lower temperature in the vehicle); and a function with respect to an information and communication system of the vehicle (for example, page forward/page back in menu pages, raise/lower audio volume).

The at least one predefined gesture event can describe a movement sequence of the radio key with respect to one or more of the following parameters: a movement direction (for example, horizontal/vertical, right/left, up/down); a chronological sequence of movement directions (for example, a first movement direction followed by a second, different movement direction), a movement speed (for example, slow, i.e., below a slow threshold, fast, i.e., above a rapidity threshold); and a chronological development of the movement speed (for example, acceleration from slow to fast). These parameters can be combined in manifold ways to define a gesture event.

The radio key can furthermore include an armband to fasten the radio key to an arm of a user. This can be the case, for example, if the radio key does not have to be fixed at a specific point in the vehicle to start an engine of the vehicle (as is the case, for example, in the "keyless go" function). The radio key thus does not run the risk of falling out and unintentionally triggering a function of the vehicle in this case. In addition, a simple and traffic-safe control of functions can thus also be performed in the interior of the vehicle, since the view does not have to be turned away from the traffic situation, because the control occurs via the gesture recognition module located on the wrist.

As an alternative or continuing measure for preventing unintentionally performed gestures from resulting in undesired events, in one exemplary embodiment, an initial gesture can be defined, which is used as a trigger for an actually intended gesture or sequence of further gestures. This initial gesture can already be predefined or can be predefined by the user himself.

Because of the capability of controlling vehicle functions on the basis of gestures, in one exemplary embodiment, the radio key does not include any mechanical buttons (in particular, no mechanical button for controlling a function in the vehicle). This has the advantage of a cost reduction and greater robustness of the vehicle key.

According to a further aspect, a supervision unit for a vehicle is described. The supervision unit is configured for controlling at least one function in the vehicle and includes a supervision unit communication module, which is configured to receive a signal associated with a movement sequence of a radio key from the radio key. The signal associated with a movement sequence of the radio key can be, for example, a (possibly coded) sequence of sensor signals, which was recorded by a movement sensor of the radio key. On the other hand, the signal can be a transmission signal, which is associated with a predefined gesture event, which was detected in the radio key as a result of the movement sequence of the radio key.

A supervision unit control module (for example, a microprocessor) of the supervision unit is configured to initiate the execution of a function of the vehicle associated with the received signal. For this purpose, the supervision unit can include a supervision unit memory module (for example, a random access memory (RAM)), which is configured to store an association between a plurality of received signals (for example, a plurality of transmission signals or a plurality of predefined gesture events) and a corresponding plurality of functions of the vehicle.

The supervision unit can be configured to ascertain a position of the radio key in relation to the vehicle (for example, on the basis of a plurality of antennas attached at different points in the vehicle, which communicate with the radio key), and the supervision unit memory module can be configured, for each of a plurality of different positions of the radio key (for example, the exterior of the vehicle and the interior of the vehicle), to store an association between the plurality of received signals (for example, the plurality of transmission signals or the plurality of predefined gesture events) and a corresponding plurality of functions of the vehicle. This allows different vehicle functions to be controlled, for example, in the interior and in the exterior of the vehicle, on the basis of gestures, which are detected using the radio key.

According to a further aspect, a system for controlling at least one function of a vehicle is described, wherein the system includes a radio key and/or a supervision unit, as described in the present document. Furthermore, the system includes a configuration unit, wherein the configuration unit is configured to execute one or more of the following tasks. For example, a gesture event of the radio key can be defined on the basis of the configuration unit. The defined gesture event can be stored, for example, in the memory module of the radio key and/or in the supervision unit memory module. On the basis of the configuration unit, for example, a predefined gesture event can be associated with a transmission signal. This association can be stored in the memory module of the radio key, for example. On the basis of the configuration unit, for example, a transmission signal can be associated with a function of the vehicle. This association can be stored, for example, in the supervision unit memory module. On the basis of the configuration unit, for example, a predefined gesture event can be associated with a function of the vehicle. This association can be stored, for example, in the supervision unit memory module.

It is to be noted that in specific exemplary embodiments, the configuration unit can be used in systems which only include the radio key (but not the supervision unit). The configuration unit is then used for configuration of the data stored on the radio key (for example, for configuration of gesture events which are stored on the memory module of the radio key) and can be implemented, for example, as a software program runnable on a computer separately from the vehicle and from the radio key. In further exemplary embodiments, the configuration unit is used in combination with the supervision unit (i.e., separately from the radio key). The configuration unit is then used for configuration of the data stored on the supervision unit (for example, for the configuration of gesture events which are stored on the supervision unit memory module). In general, according to a further aspect, a configuration unit for configuration of a radio key and/or for configuration of a supervision unit is described.

According to a further aspect, a method for controlling at least one function of a vehicle is described. The method comprises the detection of a movement sequence of a radio key (for example, on the basis of a gesture detection module in the radio key). The method furthermore comprises the determination of whether the detected movement sequence corresponds to a first of at least one predefined gesture event. This step can be performed, for example, within the radio key or within a supervision unit for a vehicle. If the detected movement sequence corresponds to the first predefined gesture event, a function of the vehicle associated with the first predefined gesture event is initiated. This initiation is performed, for example, by transmitting a transmission signal corresponding to the gesture event from the radio key to the supervision unit and/or by generating instructions of the supervision unit to a component of the vehicle, which has to execute the associated function.

It is to be noted that the methods, devices, and systems described in this document can be used both alone and also in combination with other methods, devices, and systems described in this document. Furthermore, any aspects of the methods, devices, and systems described in this document can be combined with one another in manifold ways. In particular, the features of the claims can be combined with one another in manifold ways.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
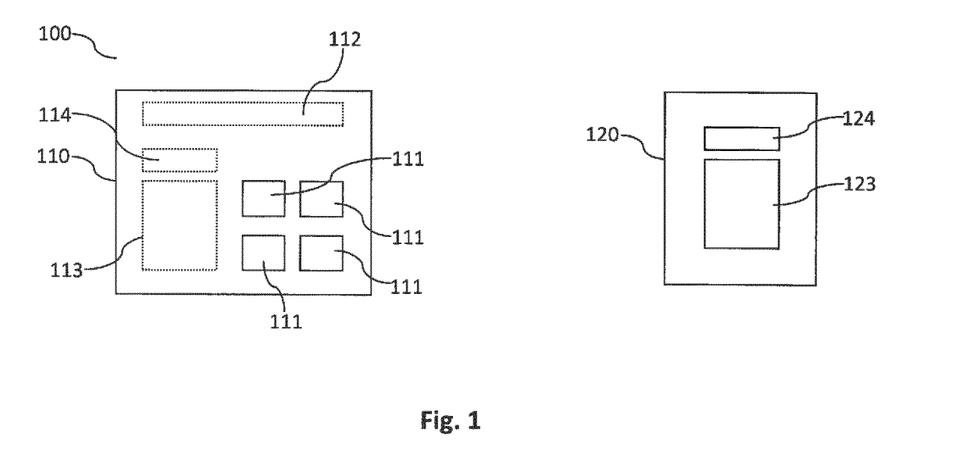
FIG. 1 shows an exemplary radio key and a corresponding supervision unit in the vehicle.

FIG. 1 describes an exemplary system 100 consisting of a radio key 110 and a corresponding supervision unit 120 in a vehicle. The elements shown by dashed lines in the figures indicate that these elements can be implemented in the interior of a radio key, and therefore do not influence the design of the surface of the radio key. The radio key 110 has a plurality of physical buttons 111. The actuation of a button 111 is registered, for example, via a contact or a switch below the button 111. The registered actuation is conducted as a control signal to a control module 113 of the radio key. The control module 113 of the radio key converts the registered control signal into a suitable transmission signal, which is transmitted via a communication module 114 (which comprises an antenna, for example) of the radio key 110 to the supervision unit 120 in the vehicle. The radio key 110 can communicate for this purpose with the supervision unit 120 in a specific high-frequency range (for example, Europe: 433 MHz or 868 MHz, Japan and USA: 315 MHz). The supervision unit 120 in the vehicle includes for this purpose a communication module 124 (which comprises an antenna, for example). Furthermore, the supervision unit 120 includes a control module 123, which interprets the received transmission signal and initiates the execution of a corresponding function of the vehicle.

Exemplary vehicle functions are, for example, the opening or the closing of a vehicle door. The driver actuates, for example, a button 111 identified with "closing" on the radio key 110, which is registered by the control module 113 of the radio key 110. The control module 113 transmits the transmission signal corresponding to the function "closing" to the supervision unit 120, which thereupon initiates the "closing" of one or more doors of the vehicle.

An authentication between the supervision unit 120 of the vehicle and the radio key 110 is typically performed in conjunction with the communication between radio key 110 and supervision unit 120. This can be performed, for example, by the exchange of suitable authentication codes (for example, rolling codes) and/or by suitable authentication methods (for example, challenge-response method). It can thus be ensured that only an authenticated radio key 110 can control a vehicle function via the supervision unit 120.

As shown in FIG. 1, the radio key 110 can also include, in addition to the above-mentioned components, a physical key 112, which can be used for the purpose of mechanically opening a door of the vehicle, for example, in the event of problems in the radio transmission. As further components (not shown), the radio key 110 usually has a power supply (for example, a battery), which supplies the electronic components (for example, the control module 113, the communication module 114, and/or the electronic components of the buttons 111) of the radio key 110 with power.

As already described above, the radio key 110 having its physical buttons 111 has disadvantages with respect to the robustness in relation to environmental influences, with respect to the production costs, and with respect to the scope and flexibility of the vehicle functions to be controlled. Accordingly, it is proposed that these disadvantages of the radio key 110 can be remedied by a radio key which can recognize one or more gestures of a user of the radio key, and controls one or more functions of the vehicle in dependence on the recognized gestures. It thus becomes possible to provide radio keys which do not have physical buttons 111 (for example, no mechanical buttons).

Figure 2A:
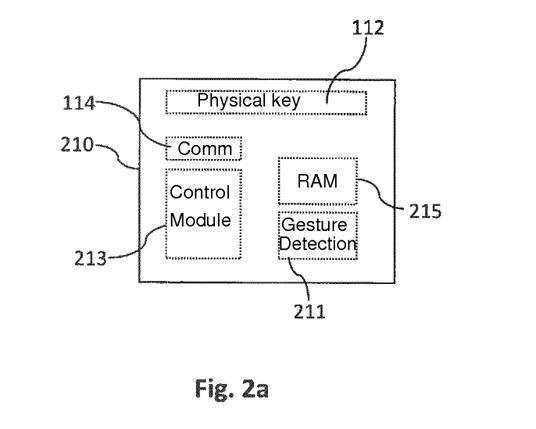
FIG. 2a shows an exemplary radio key having gesture recognition.

FIG. 2a shows an exemplary radio key 210 having gesture recognition for controlling vehicle functions. In one exemplary embodiment, the radio key 210 is operated using the supervision unit 120 from FIG. 1, i.e., using the supervision unit 120, which is used in conjunction with a button-based radio key 110. In this exemplary embodiment, the electronics in the vehicle remain unchanged, and only the button-based radio key 110 is replaced by a gesture-based radio key 210. It is therefore possible to use gesture-based radio keys 210 as a replacement for button-based radio keys in already delivered vehicles having already delivered supervision units 120.

The radio key 210 shown in FIG. 2a does not have any physical/mechanical buttons 111. However, the radio key 210 includes a gesture detection module 211, which is configured to recognize one or more gestures of a user of the radio key 210. The gesture detection module 211 includes, for example, an acceleration sensor, which is capable of recognizing the speed change of a linear movement. Alternatively or additionally, the gesture recognition module 211 includes, for example, a gyroscope, which is capable of measuring the rotational speed of a rotational movement. In particular, direction changes can be measured using a gyroscope. For example, the gesture detection module 211 may have a three-axis gyroscope in combination with a three-axis acceleration sensor, which, in cooperation, enable two different physical variables (rotational speed or acceleration) to be recognized along a total of six axes. This allows the movement of an object to be detected in three dimensions, i.e., this allows the detection of movements having six degrees of freedom.

The gesture detection module 211 can be configured to generate a sequence of sensor signals, from which the direction and/or the speed of a movement may be ascertained. In other words, the gesture detection module 211 can be configured to convert a movement sequence of the radio key 210 into a sequence of sensor signals, wherein the sequence of sensor signals uniquely describes the relative movement sequence. In still other words, the gesture detection module 211 can be configured for the purpose of uniquely describing the change of the position of the radio key 210 from a starting position to an end position on the basis of a sequence of sensor signals.

The sequence of sensor signals detected by the gesture detection module 211 is relayed to a control module 213 of the radio key 210. The control module 213 can be configured for the purpose of receiving the sequence of sensor signals from the gesture detection module 211, and detecting one or more predefined gesture events on the basis of the received sequence of sensor signals. If the control module 213 detects a predefined gesture event, the control module 213 thus generates a corresponding transmission signal, which is transmitted via the communication module 114 of the radio key 210 to the supervision unit 120. The supervision unit 120 in the vehicle interprets the received transmission signal and initiates the execution of a corresponding function of the vehicle on the basis of the control module 123.

The gesture-based radio key 210 can furthermore include a memory module 215 (for example, random access memory (RAM)). An assignment between one or more gesture events and one or more vehicle functions can be stored in the memory module 215. A gesture event describes in this case properties of a movement sequence, for example, the direction or the combination of directions of a movement sequence, and/or the speed or the speed development of a movement sequence. As already described above, the movement sequence can be converted by the gesture recognition module 211 into a sequence of sensor signals, wherein the sequence of sensor signals uniquely describes the movement sequence. A gesture event can therefore be stored in the memory module 215 as a reference sequence of sensor signals. For example, a plurality of gesture events can be stored as a plurality of reference sequences in the memory module 215.

For the detection of a gesture event, the control module 213 of the radio key 210 compares the sequences of sensor signals received from the gesture detection module 211 to the gesture events stored in the memory module 215 (i.e., to the stored reference sequences). The comparison can include the ascertainment of a deviation, for example, the ascertainment of a root mean square deviation, of the received sequence from a stored reference sequence. If it is established that the deviation is less than a predefined threshold value, the corresponding gesture event is thus detected.

It is to be noted that in the case of the recognition of gestures, methods or algorithms can also be used, which tailor themselves adaptively to the individual idiosyncrasies of the user, to thus increase the recognition performance and the user comfort accordingly.

The radio key 210 can be implemented to continuously detect sensor signals via the gesture detection module 211 and compare them to the stored gesture events. To save energy, however, it can be advantageous for the radio key 210 to recognize whether it is in a predefined vicinity of the vehicle (for example, is at a distance of less than 5 m from the vehicle). The radio key 210 can monitor for this purpose whether it receives (via the communication module 114) a signal of the supervision unit 120 of the vehicle. If the signal of the supervision unit 120 is received, the radio key 210 thus recognizes that it is located within the predefined vicinity of the vehicle. In this case, the radio key 210 can be implemented to only detect and analyze sensor signals if the radio key 210 is located within the predefined vicinity of the vehicle.

In addition to the predefined gesture events, functions of the vehicle associated with indications can be stored in the memory module 215 of the radio key 210. In other words, a desired function of the vehicle can be associated with each predefined gesture event in the memory module 215. As described above, the radio key 210 communicates a desired function via a transmission signal with the supervision unit 120 of the vehicle. The transmission signal is interpreted by the supervision unit 120, and the supervision unit 120 subsequently initiates the execution of the corresponding function in the vehicle. To execute a plurality of functions, a plurality of corresponding transmission signals can be defined between radio key 210 and supervision unit 120, so that a specific transmission signal uniquely triggers an associated specific function of the vehicle. The memory module 215 can be used for the purpose of storing the transmission signals or indications on the transmission signals in conjunction with the predefined gesture events. In one exemplary embodiment, the memory module 215 includes a list of predefined gesture events (for example, a list of reference sequences of sensor signals) each having associated transmission signals (which each correspond to a vehicle function).

Figure 3:
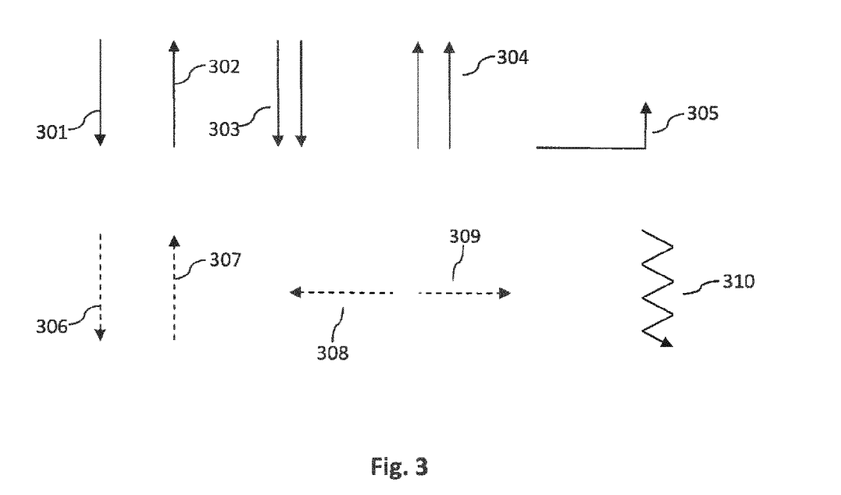
FIG. 3 shows exemplary gesture events, which can be used for controlling vehicle functions.

FIG. 3 shows exemplary gesture events 301 to 310. The direction of the arrows indicates a movement direction, solid arrows stand for a high movement speed and dashed arrows stand for a slow movement speed. The gesture event 301 describes a single rapid downward movement. The gesture event 302 describes a single rapid upward movement. The gesture event 303 describes a double rapid downward movement. The gesture event 304 describes a double rapid upward movement. The gesture event 305 describes a rapid lateral movement to the right, followed by a rapid upward movement. The gesture event 306 describes a single slow downward movement. The gesture event 307 describes a single slow upward movement. The gesture event 308 describes a slow lateral movement to the left. The gesture event 309 describes a slow lateral movement to the right. The gesture event 310 describes a rapid zigzag movement downward.

It is to be noted that the gesture events shown in FIG. 3 are only examples. For example, more complex, composite gesture events are also contemplated, which are composed of movements in multiple directions and/or at various speeds.

These gesture events 301-310 can be stored as predefined gesture events in the memory module 215 of the vehicle key 210. In addition, various vehicle functions can be associated with the gesture events 301-310 (which can be communicated by corresponding transmission signals to the supervision unit 120 of the vehicle). Thus, the closing of the vehicle doors could be associated with the gesture event 301, the opening of the vehicle doors could be associated with the gesture event 302, the closing of only the driver door could be associated with the gesture event 303, the opening of only the driver door could be associated with the gesture event 304, and the opening of the trunk of the vehicle could be associated with the gesture event 305. Furthermore, the closing of the vehicle windows could be associated with the gesture event 306, the opening of the vehicle windows could be associated with the gesture event 307, folding in the rearview mirror of the vehicle could be associated with the gesture event 308, folding out the rearview mirrors could be associated with the gesture event 309, and the panic function, i.e., the triggering of the alarm system of the vehicle, could be associated with the gesture event 310.

In summary, it can be stated that a plurality of various gesture events can be associated with a plurality of vehicle functions. The association is flexible and can be stored in the memory module 215 of the radio key 210. In the abovementioned example, an analysis of the sequences of sensor signals detected by the gesture detection module 211 is performed in the radio key 210. The radio key 210 compares the sequence of sensor signals to gesture events stored in the radio key 210 and, in the event of detection of a gesture event, transmits a transmission signal corresponding to the gesture event to the supervision unit 120 in the vehicle. The transmission signal can uniquely contain or identify a vehicle function, which is then initiated by the supervision unit 120. In particular, the transmission signals can correspond precisely physically and in content to the transmission signals used in a button-based radio key 110, so that the gesture-based radio key 210 can be used as a direct replacement for a button-based radio key 110.

In a further exemplary embodiment, the transmission signal uniquely identifies the detected gesture event (but not necessarily the function thus to be triggered). In this case, a flexible linkage can be produced between gesture event and function to be triggered in the supervision unit of the vehicle. That is, in this exemplary embodiment, the association of gesture events and functions is performed in the supervision unit of the vehicle (and not necessarily in the memory module 215 of the radio key 210). This solution is advantageous, for example, to reduce the costs (with regard to memory costs and processor costs) of the radio key 210. On the other hand, this solution requires, inter alia, an adaptation of the supervision unit 120.

Figure 2B:
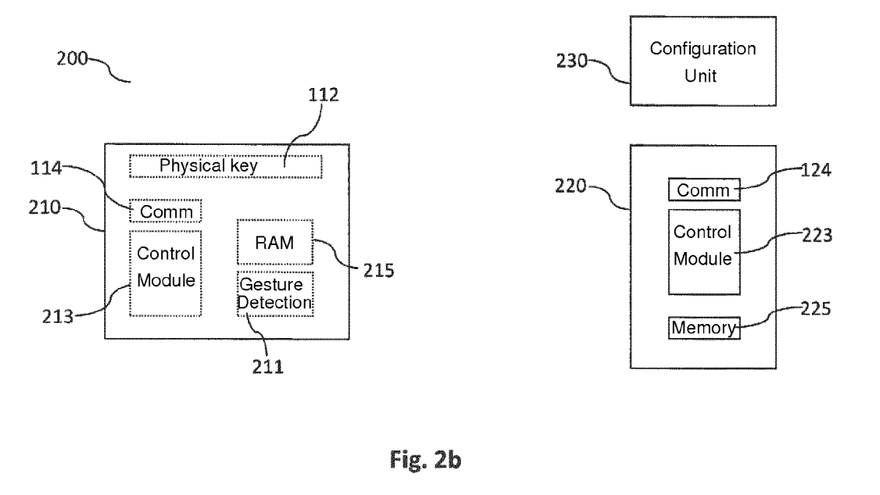
FIG. 2b shows an exemplary system having a radio key and a corresponding supervision unit in the vehicle.

An exemplary embodiment in which the association of gesture events and functions can be performed in the supervision unit is shown in FIG. 2b. In FIG. 2b, a system 200 for controlling vehicle functions is shown, which includes a supervision unit 220 and the radio key 210 already described in FIG. 2a. The supervision unit 220 includes a memory module 225, in which linkages between transmission signals and vehicle functions can be stored. The supervision unit 220 receives a transmission signal via the communication unit 124, and a control module 223 of the supervision unit 220 ascertains the function linked to the transmission signal from the memory module 225 of the supervision unit. Subsequently, the control module 223 of the supervision unit 220 initiates the execution of the ascertained function in the vehicle.

In a further exemplary embodiment, the radio key 210 transmits the sequences of sensor signals (possibly in coded form) detected by the gesture detection module 211 via the communication module 114 to the supervision unit 220. The control module 213 of the radio key 210 receives a sequence detected by the gesture detection module 211 and codes it for the transmission to the supervision unit 220 of the vehicle. The sequences are decoded in the supervision unit 220 and the control module 223 of the supervision unit 220 compares the received sequence of sensor signals to predefined gesture events, which are stored in the memory module 225 of the supervision unit 220. Upon detection of a gesture event, the supervision unit 220 (for example, the control module 223) initiates the execution of a vehicle function associated with the detected gesture event. The association between gesture events and vehicle functions can also be stored in the memory module 225.

In the last exemplary embodiment, the memory module 215 in the radio key 210 can possibly be omitted, since the predefined gesture events are stored in the supervision unit 220. Furthermore, the required processor power of the control module 213 in the radio key 210 is reduced, since the detection of gesture events is performed in the supervision unit 220. Therefore, the hardware costs of the radio key can be reduced. On the other hand, the transmission of sequences of sensor signals results in an increased data rate on the radio interface between radio key 210 and supervision unit 220, which can also result in an increased power consumption of the radio key 210.

The system 200 can be configured for the purpose of enabling a user to define his own gesture events and to store them as predefined gesture events in the memory module 215 of the radio key 210 and/or the memory module 225 of the supervision unit 220. In one exemplary embodiment, the system 200 includes a configuration unit 230. The configuration unit 230 could be implemented, for example, in the scope of the information and entertainment system of the vehicle. In particular, the configuration unit could use a display screen and the input capabilities (for example, buttons or a touchscreen) of the information and entertainment system.

The configuration unit 230 enables a user, for example, to define his own gesture events and to store them as predefined gesture events in the memory module 215 of the vehicle key 210 and/or in the memory module 225 of the supervision unit 220. The configuration unit 230 could prompt the user to input a gesture event via a user interface (for example, via a display screen). The user then moves the radio key 210 in a desired manner, and the gesture detection module 211 detects an associated sequence of sensor signals. This sequence of sensor signals can then be stored as a reference sequence for the gesture event in the memory module 215 of the vehicle key 210 and/or in the memory module 225 of the supervision unit 220. To increase the robustness of the gesture recognition, it can be advantageous to record a plurality of versions of the desired movement, and to store a reference sequence for the gesture event, which is ascertained from the plurality of detected sequences of sensor signals (for example, as an averaged sequence of sensor signals).

Alternatively or additionally, the configuration unit 230 enables a user to associate a function of the vehicle with the gesture events stored in the memory module 215 of the key 210 and/or in the memory module 225 of the supervision unit 220 and to store corresponding indications (for example, corresponding transmission signals or corresponding functions) in the memory module 215 of the vehicle key 210 and/or in the memory module 225 of the supervision unit 220. For this purpose, the configuration unit 230 could propose a list of possible vehicle functions to the user via a user interface (for example, via a display screen), from which the user can search out a desired function. An indication of the desired vehicle function (for example, a corresponding transmission signal) is then stored in conjunction with a gesture event in the memory module 215 of the radio key 210 and/or in the memory module 225 of the supervision unit 220.

It is to be noted that a certain number of basic functions and gesture events (for example, open, close, unlock trunk, panic function, open/close power windows) can already be predefined and trained. The configuration unit 230 can be configured for the purpose of preventing the alteration of these basic functions and gesture events. Alternatively, the configuration unit 230 could enable a later return to the predefined and trained basic functions/gesture events ("factory settings").

The radio key 210 can be implemented for the purpose of recognizing whether it is located in the interior or in the exterior of the vehicle. In other words, the system 200 made of radio key 210 and supervision unit 220 can recognize in exemplary embodiments whether the radio key 210 is located in the interior or in the exterior of the vehicle. The vehicle functions to be controlled via the radio key 210 can then be made dependent on whether the radio key is located in the interior or in the exterior of the vehicle. Expressed more generally, the system 200 can recognize the position of the radio key 210 in relation to the vehicle and therefore can make one or more vehicle functions controllable by the radio key 210 dependent on the position of the radio key 210 in relation to the vehicle.

To recognize the position of the radio key 210 in relation to the vehicle, a corresponding plurality of antennas can be attached to a plurality of various points in the vehicle. The radio key 210 can communicate with the plurality of antennas in the vehicle and the position of the radio key 210 in relation to the vehicle can thus be ascertained (for example, on the basis of runtime differences during the communication with the plurality of antennas and/or on the basis of triangulation methods). The technology required for this purpose is already present in the scope of "keyless go" functions in many vehicles. Since the key 210 is generally no longer fixedly locked in a key insertion slot in case of the "keyless go" function, but rather can be located at any desired position in the interior of the vehicle, the key 210 can be used as a control unit for various interior functions of the vehicle via different gestures.

Therefore, the system 200 can receive items of information with regard to the position of the radio key 210 in relation to the vehicle. These items of information can be restricted to a differentiation of "interior" and "exterior" of the vehicle. However, more precise items of information with regard to the position are also conceivable, for example, "exterior" driver side/passenger side and/or "interior" front seats/back seats. The system 200 is made capable by these items of information of making the vehicle function triggered by a gesture dependent on the information present in the system 200 with regard to the position of the vehicle key 210 in relation to the vehicle.

In one exemplary embodiment, a plurality of gesture events 1, ..., N can be stored in the memory module 215 of the radio key 210. This plurality of gesture events is linked to a corresponding plurality of transmission signals, wherein the transmission signals for the supervision unit 220 uniquely identify the gesture event linked thereto. The supervision unit 220 includes the memory module 225, in which vehicle functions to be triggered in dependence on one or more positions of the radio key 210 for the plurality of transmission signals (i.e., for the plurality of gesture events) are stored. Table 1 shows exemplary entries in the memory module 225. The transmission signal #1 corresponds, for example, to the gesture event 301, the transmission signal #2 corresponds, for example, to the gesture event 302, and the transmission signal #N corresponds, for example, to the gesture event 306. Exemplary vehicle functions are indicated in Table 1 for the four different positions "exterior driver side", "exterior passenger side", "interior front" and "interior rear". The assignment of the vehicle functions to the gesture events can be performed, for example, via the configuration unit 230 by the user.

TABLE 1

| transmission signal or gesture event | position exterior driver side | position exterior passenger side | position interior front | position interior rear |
|---|---|---|---|---|
| #1 | open driver door | open passenger door | page forward | lower audio volume rear |
| #2 | close driver door | close passenger door | page back | raise audio volume rear |
| ... | | | | |
| #N | open window driver side | open window passenger side | raise temperature of air conditioning | next song audio system |

Figure 4:
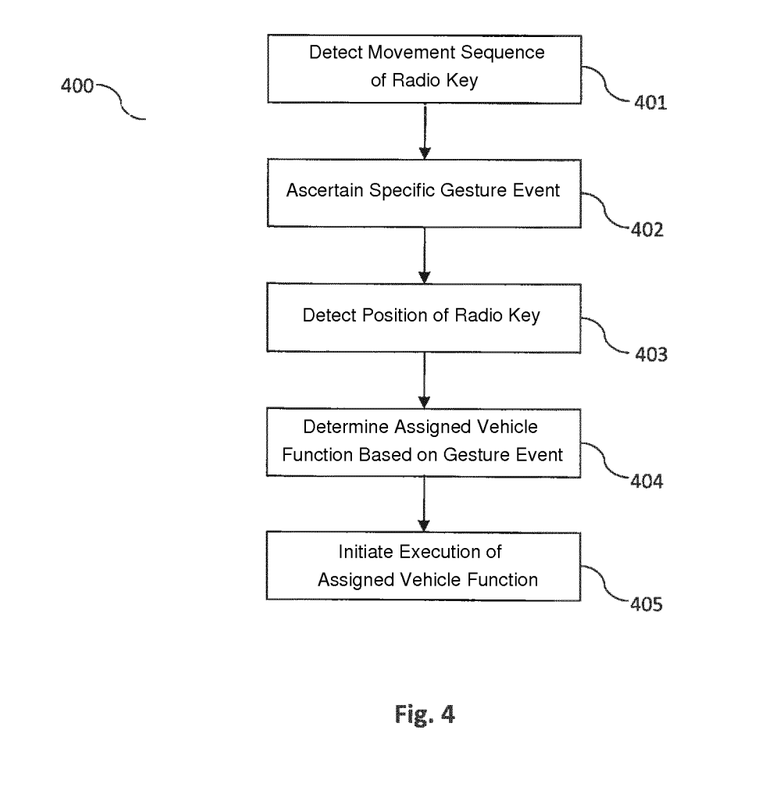
FIG. 4 shows an exemplary method for controlling vehicle functions.

FIG. 4 describes an exemplary method 400 for controlling vehicle functions on the basis of a radio key 210. The method 400 comprises the detection 401 of the movement sequence of a radio key 210. The detected movement sequence is subsequently compared to predefined gesture events, to ascertain the presence of a specific (for example, first) gesture event (step 402). The method 400 optionally comprises the detection 403 of a position of the radio key 210 in relation to a vehicle associated with the radio key (e.g., in relation to the vehicle in which the radio key 210 was previously authenticated). Subsequently, an assigned vehicle function is determined (step 404) on the basis of the ascertained gesture event and/or on the basis of the detected position and the execution of the assigned vehicle function is initiated (step 405).

The gesture-based radio key 210 can be provided with an armband, so that the radio key 210 can be worn on the arm of a driver (for example, as a "power balance" band). This is advantageous in particular in conjunction with the "keyless go" function, since in this case fixing of the key 210 in the key insertion slot of the vehicle is no longer necessary. In addition, wearing the radio key 210 on the arm reduces incorrect detections (caused, for example, by dropping the radio key) of gesture events. Alternatively, the gesture-based radio key 210 could be integrated in a mobile wireless telephone (for example, in a smart phone). Many mobile wireless telephones/smart phones already include gyroscopes and/or acceleration sensors, which can be used as the gesture detection module 211. The integration of the function of the radio key 210 in a mobile wireless telephone/smart phone requires sufficient security of the codes required for the authentication with the vehicle, however.

In the present case, a radio key and the use of a radio key for controlling vehicle functions on the basis of gestures were described. The use of a gesture-based radio key has the advantage over the use of button-based radio keys in that the gesture-based radio key can be constructed as desired and cost-effectively in shape and design and is less susceptible to environmental influences (such as soiling, moisture). In addition, the gesture-based radio key enables a relatively large number of vehicle functions to be controlled in a manner that can be reconfigured. In particular, further gesture events can be trained and linked to further functions.

In addition, the use of the radio key 210 for gesture recognition allows numerous technical problems to be avoided, which arise, for example, in camera-based gesture recognition systems. In camera-based systems, the control of vehicle functions is generally only possible in a restricted detection region (of the camera). In contrast, gestures of arbitrary persons can be detected everywhere in the interior (and in the exterior) of the vehicle via the gesture-based radio key 210. The radio key 210 can be transferred to any person (also passengers) to control vehicle functions. Therefore, it is also possible for rear seat passengers to operate the navigation device or the radio of the vehicle via the radio key 210. The radio key 210 can therefore also replace an additional rear seat remote control. In addition, no further gesture detection system in the vehicle is necessary due to the gesture-based radio key 210, which reduces the costs for gesture recognition. This gesture recognition is additionally very robust and precise, and is not subject to interference by external influences, for example, incident sunlight or shading of the detection system of a camera.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A radio key for use in controlling at least one function in a vehicle, comprising:
   a gesture detection module, which is configured to detect a movement sequence of the radio key; and
   a control module, which is programmed to initiate the execution of a function in the vehicle associated with the detected movement sequence of the radio key,
   wherein the control module is configured to recognize when the radio key is located within a predefined vicinity of the vehicle, and the gesture detection module is configured to detect the movement sequence only when the radio key is located within the predefined vicinity.

2. The radio key according to claim 1, wherein the control module is further programmed to:
   determine whether the detected movement sequence corresponds to a first of at least one predefined gesture event; and
   if the detected movement sequence corresponds to the first predefined gesture event, initiate the execution of a function associated with the first predefined gesture event in the vehicle.

3. The radio key according to claim 2, further comprising:
   a memory module, which is configured to store a plurality of predefined gesture events; wherein
   the control module is further programmed to determine whether the detected movement sequence corresponds to a first of the plurality of predefined gesture events.

4. The radio key according to one of claim 2, further comprising:
   a communication module, which is configured to transmit a transmission signal associated with the first predefined gesture event, said transmission signal being capable of informing the vehicle that the first predefined gesture event was detected on the radio key.

5. The radio key according to claim 2, wherein:
   the at least one function in the vehicle comprises one or more of the following functions:
   (1) a function with respect to a lighting of the vehicle;
   (2) a function with respect to outside mirrors, doors, windows, or a trunk of the vehicle;
   (3) a function with respect to an alarm system of the vehicle;
   (4) a function with respect to an air-conditioning system of the vehicle; and
   (5) a function with respect to an information and communication system of the vehicle.

6. The radio key according to claim 5, wherein:
   the at least one predefined gesture event describes a movement sequence of the radio key with regard to one or more of the following:
   (1) a movement direction;
   (2) a chronological sequence of movement directions;
   (3) a movement speed; and
   (4) a chronological development of the movement speed.

7. The radio key according to claim 2, wherein:
   the at least one predefined gesture event describes a movement sequence of the radio key with regard to one or more of the following:
   (1) a movement direction;
   (2) a chronological sequence of movement directions;
   (3) a movement speed; and
   (4) a chronological development of the movement speed.

8. The radio key according to claim 1, wherein the gesture detection module comprises a gyroscope and/or an acceleration sensor.

9. The radio key according to one of claim 8, further comprising:
   a communication module, which is configured to transmit a transmission signal associated with the first predefined gesture event, said transmission signal being capable of informing the vehicle that the first predefined gesture event was detected on the radio key.

10. The radio key according to claim 1, wherein:
    the radio key is configured to ascertain a position of the radio key in relation to the vehicle; and
    the function associated with the detected movement sequence in the vehicle is dependent on the position of the radio key.

11. The radio key according to claim 1, wherein:
    the radio key is configured to ascertain a position of the radio key in relation to the vehicle; and
    the function associated with the detected movement sequence in the vehicle is dependent on the position of the radio key.

12. The radio key according to claim 1, further comprising an armband to fasten the radio key to an arm of a user.

13. The radio key according to claim 1, wherein the radio key does not have any mechanical buttons for controlling a function in the vehicle.

14. A supervision unit for a vehicle, wherein the supervision unit is configured to control at least one function in the vehicle, the supervision unit comprising:
> a supervision unit communication module configured to:
>> ascertain a position of the radio key in relation to the vehicle, and
>> receive a signal associated with a movement sequence of a radio key from the radio key only when the radio key is within a predetermined vicinity of the vehicle; and
>
> a supervision unit control module, which is configured to initiate the execution of a function of the vehicle associated with the received signal.

15. The supervision unit according to claim 14, further comprising:
> a supervision unit memory module; wherein
> the supervision unit memory module is configured to store an association between a plurality of different received signals and a corresponding plurality of functions of the vehicle.

16. The supervision unit according to claim 15, wherein:
> the supervision unit memory module is configured to store, for each of a plurality of different positions of the radio key, an association between the plurality of received signals and a corresponding plurality of functions of the vehicle.

17. A system for controlling at least one function of a vehicle, comprising:
> a radio key comprising a gesture detection module configured to detect a movement sequence of the radio key and a control unit;
> a supervision unit in the vehicle, the supervision unit comprising a supervision unit control module and a supervision unit communication module configured to receive a signal associated with the movement sequence of the radio key;
> a configuration unit configured to:
>> (i) define a gesture event of the radio key;
>> (ii) associate a predefined gesture event with a transmission signal;
>> (iii) associate the transmission signal with the function of the vehicle; and/or
>> (iv) associate the predefined gesture event with the function of the vehicle,
>
> wherein the control module of the radio key and/or the supervision control module of the supervision unit are configured to initiate the execution of the function of the vehicle associated with the detected movement sequence of the radio key or the transmission signal.

18. A method of controlling at least one function of a vehicle, the method comprising the acts of:
> detecting a position of a radio key with respect to the vehicle;
> detecting a movement sequence of the radio key only when the position of the radio key is within a predefined vicinity of the vehicle;
> determining whether the detected movement sequence corresponds to a first of at least one predefined gesture event; and
> initiating a function of the vehicle associated with the predefined gesture event if the detected movement sequence corresponds to the first predefined gesture event.

19. The method according to claim 18, further comprising the acts of:
> determining a position of the radio key with respect to the vehicle; and
> wherein the function of the vehicle associated with the first predefined gesture event varies depending on the position of the radio key with respect to the vehicle.

* * * * *